United States Patent [19]
Edwards

[11] 3,901,301
[45] Aug. 26, 1975

[54] PNEUMATIC TIRES AND WHEEL ASSEMBLIES

[75] Inventor: Reginald Harold Edwards, Sutton Coldfield, England

[73] Assignee: The Dunlop Company Limited, England

[22] Filed: Nov. 7, 1973

[21] Appl. No.: 413,604

[30] Foreign Application Priority Data
Nov. 10, 1972 United Kingdom.............. 51914/72

[52] U.S. Cl. .................... 152/330 L; 152/330 RF
[51] Int. Cl. ...................... B60c 17/00; B60c 5/00
[58] Field of Search ..... 152/330 RF, 399, 400, 300, 152/330 L; 252/10; 184/1 R

[56] References Cited
UNITED STATES PATENTS

| | | | |
|---|---|---|---|
| 2,399,572 | 4/1946 | Powell et al. ....................... | 152/400 |
| 2,552,336 | 5/1951 | Marcum............................... | 152/400 |
| 3,739,829 | 6/1973 | Powell et al. .................. | 152/330 RF |

*Primary Examiner*—Drayton E. Hoffman
*Attorney, Agent, or Firm*—Stevens, Davis, Miller & Mosher

[57] ABSTRACT

Enclosing means for enclosing at least part of a lubricant composition for use in pneumatic tire/wheel assemblies, comprises a container having an aperture therein sealable by a sealing member which member comprises a solid material having a softening and/or melting point in the range 60°C, to 100°C, the solid material allowing release of the composition when the temperature in the assembly rises due to use thereof in a deflated condition.

27 Claims, 12 Drawing Figures

PNEUMATIC TIRES AND WHEEL ASSEMBLIES

This invention relates to pneumatic tire and wheel assemblies.

On partial or complete deflation of a pneumatic tire mounted upon a wheel, during running of a vehicle, opposite surfaces in the interior of the tire and wheel assembly come into contact with one another under more or less load according to whether or not the deflation is complete; the regions of the interior surfaces which normally come into contact are the interior surfaces of the tire close to but radially outwardly of the rim flanges and the interior surfaces of the tire close to but laterally inwardly of the tread edge if the tread is wider than the wheel rim.

The temperatures of the tire and the air space formed within the tire rises during the running of the tire. Upon partial or complete deflation of a tire and wheel assembly the above-mentioned surfaces come into contact and cause considerable heat to be generated within the rubber and textile components of the tire, a major source of which is the relative movement of the surfaces in contact and under load; the temperature rise due to the heat generation is particularly marked because of the high coefficient of friction of dry rubber to dry rubber. It is the temperature rise above the normal running temperature of the assembly that causes rapid structural failure of the tire.

This disadvantage may be reduced or obviated by the use of lubricant compositions in enclosing means which release the lubricant composition on deflation of the tire, as described in the assignee's British Pat. Specification 1,359,467.

The present invention is concerned with an enclosing means for enclosing at least part of a lubricant composition which is activated by the temperature rise that occurs within the assembly when used in a deflated condition.

According to the invention, an enclosing means for enclosing at least part of a lubricant composition for use in a pneumatic tire and wheel assembly, comprises a container in which the lubricant composition is located, an aperture in the container through which the lubricant composition can leave the container, and a sealing member for sealing the aperture, the member comprising at least in part a solid material having a softening and/or melting point in the range 60°C. to 120°C., whereby the member prevents escape of lubricant from the container during use of the enclosing means in normal running of the tire but on the build-up of an excessive temperature in the interior of the tire and wheel assembly the solid material of the sealing member will soften and/or melt and thereby release the lubricant composition.

The sealing member may comprise a blob of the solid material located so as to cover the aperture and such a blob of material may at least partially enter the aperture to ensure good anchorage therein and sealing thereof.

Alternatively, the sealing member may comprise a closure means and the solid material, the latter retaining the closure means in position to seal the aperture.

It may be desirable for the sealing member to comprise a dual actuated lubricant composition release mechanism, the mechanism having an aperture therethrough sealable by at least the solid material, whereby during use if the mechanism fails to release the lubricant composition on deflation of the tire and wheel assembly, the temperature in the assembly will rise and cause the solid material to soften and/or melt and thereby release the lubricant composition. For example, the sealing member may comprise a peg having an aperture therethrough sealed at one end with the solid material, the peg fitting fluid-tightly in the aperture in the container whereby during use upon deflation of the assembly the peg can be pushed, by the tread of the tire, into the container to release the lubricant composition, or should this fail the temperature in the assembly will rise and the lubricant composition released by the softening and/or melting of the solid material.

In a further preferred example of a dual actuated release mechanism, the sealing member may be in the form of a valve, said valve comprising a valve plug which fits fluid-tightly in the aperture of the container and has a recessed portion open to the exterior of the container, a valve peg which is located in the recess portion and is an interference fit with the inner part thereof, both the valve plug and the valve peg have an aperture extending therethrough, the apertures being co-axial one with the other in use, the end of the aperture in the valve peg remote from the recess portion being sealed by the solid material. The operation of the valve is similar to that described above in relation to the peg. However, in this construction, after the valve plug is inserted fluid-tightly into the aperture in the container and the valve peg is located in the recessed portion, due to the interference fit of the peg in the inner part of the recess portion the plug is not deformable in this region and is thereby restrained from accidental release outwardly of the container; but since the outer part of the recessed portion is not an interference fit this can be deformed and the plug and peg can therefore be pushed into the container.

According to the invention also, a pneumatic tire and wheel assembly comprises an enclosing means as described in the immediately preceding paragraphs.

Preferably the solid material is a material having a high thermal diffusivity $(D)$ $(D = k/cp$ where $k$ is the thermal conductivity, $c$ is the specific heat and $p$ is the density).

The material of the container may be of any suitable material e.g. plastics material, preferably of low thermal conductivity or thin metal or metal alloy sheet material, for example aluminium. When the container is made of metal or metal alloy, e.g. aluminium, preferably it has an inner liner of a material of low thermal conductivity to minimize heat losses to the lubricant composition.

It may be desirable, particularly when the container comprises a material having a high thermal conductivity to thermally isolate the sealing member from the container. Thermal insulation may be achieved, for example, by the sealing member further comprising a cover for the aperture of the container which cover may be a sheet of material having a low thermal conductivity and having a second aperture therein which may be sealed by the solid material or the closure means and the solid material. Preferably the closure means, when used, is also of a material of low thermal conductivity and may, for example, be made of the same material as the sheet. The heat losses to the material of the container and the lubricant composition are thereby minimized.

The container may be provided with a lid, e.g. a screw-threaded cap fitting a complementary screw-threaded portion on the container, the lid may or may not be the portion of the container having the aperture therein. When the lid has the aperture therein the sealing member seals the aperture as previously described. In an alternative construction the sealing member may form the lid and can be provided with a screw-threaded portion which fits a complementary screw-threaded portion associated with the aperture.

In a further alternative, when it may be desirable to seal the aperture prior to the lubricant composition being located in the container, e.g. for safety reasons if the lubricant composition contains a volatile component as described in U.S. Pat. No. 3,739,829 and U.S. applications Ser. Nos. 353,937 and 353,938 both filed Apr. 24, 1973, the container may be provided with a self-sealing rubber diaphragm in a wall thereof through which the lubricant may be injected (and air extracted if necessary) after the container has been sealed.

Preferably the heat supply to the solid material is maximized. This may be achieved by the material being in good thermal contact with a film of material having a high thermal diffusivity. The film may be provided on the outer surface of the container or on the outer surface of the sheet of material. The film may also be on the outer surface of the closure means. Alternatively, the container may comprise a material of high thermal diffusivity e.g. aluminium, in which case the container as previously described, is preferably provided with an inner liner of low thermal conductivity. The film of material having a high thermal diffusivity may be provided with a matt black surface to maximize the heat absorption.

Additionally, heat may be supplied to the material of high thermal diffusivity and/or the solid material by a device which converts mechanical energy into heat. The device may be arranged to deflect once per revolution when the tire and wheel assembly is used in the deflated condition. The mechanical energy created by such deflection can then be converted to heat and transferred to the material.

The softening point of the solid material is preferably in the range 70°C. to 100°C.

Instances may occur when vehicles having tire and wheel assemblies incorporating enclosing means according to the present invention have their paintwork touched up or are completely resprayed and passed through a drying oven with the tires and the enclosing means still fitted to the vehicles. Such ovens operate at temperatures sufficient to cause the solid material to soften and/or melt which, due to the pressure induced in the containers as the lubricant composition therein heats up, may cause accidental release of the lubricant composition. In these circumstances the aperture may be formed with a constricted capillary portion at the end thereof opening to the tire and wheel assembly interior so that the vapor pressure created in the container will be insufficient to blow the softened and/or molten material past the constricted portion out of the aperture in the static and inflated state of the assembly but under dynamic and deflated conditions the lubricant will be released. A similar constriction is preferably provided at the other end of the aperture to prevent flow of the solid material in its molten state back into the container under the influence of gravity or possibly due to the inflation pressure in the assembly.

In an alternative construction, the aperture in the container may be extended by a tube, sealed by the sealing member, having at least one constricted portion therein, the tube being located co-axially with the aperture in the container and fluid-tightly attached to the container. Preferably the tube is made of a material having a high thermal diffusivity.

The invention will now be described by way of example only with reference to the accompanying drawings of which:

Figure 1:
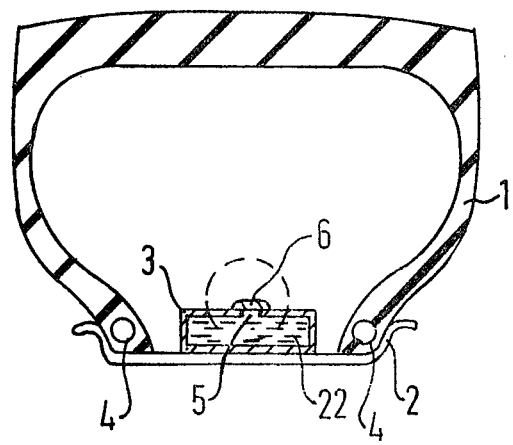
FIG. 1 shows a schematic cross-section of a tire and wheel assembly with a container in accordance with the invention located on the wheel rim.
Figure 2:
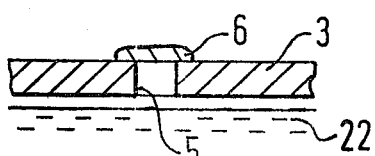
FIG. 2 shows an enlarged partial cross-section of a portion of the container enclosed in the chain dotted circle in FIG. 1.
Figure 3:
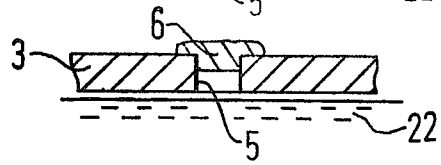
FIGS. 3 to 6 show similar views as shown in FIG. 2 with modifications thereon.

FIG. 1 shows a tire 1 located on a wheel rim 2. A lubricant composition enclosing means 3 is located on the rim 2 between the tire beads 4 and is filled with lubricant 22. The container 3 has an entry/exit aperture 5 which is circular. The aperture 5 is sealed by a sealing member in the form of a blob of solid material 6 which is a solder alloy having a melting point of e.g. between 60°C. and 120°C. and a high thermal diffusivity. FIG. 3 shows a slight variation in which the plug of material 6 extends partly into the aperture 5.

Figure 4:
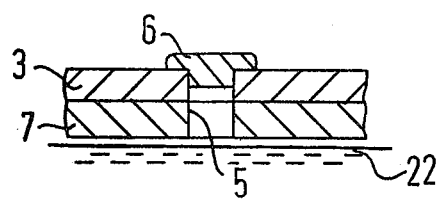

The container 3 as previously mentioned can be made of plastics or metal or metal alloy, for example aluminium in which case it preferably has an inner liner of a low thermal conductivity material 7 as shown in FIG. 4.

Figure 5:
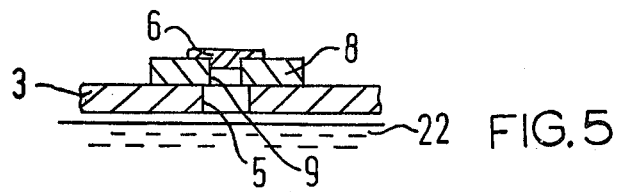

In an alternative construction, shown in FIG. 5, the sealing member may be thermally insulated from the container 3 by further comprising a sheet 8 of a material of low thermal conductivity e.g. Tufnol (a reinforced phenol/formaldehyde resin available from Tufnol Limited, Birmingham, England). A second aperture 9 is provided in the sheet 8 which is sealed by the blob of the solid material 6. The sheet 8 is fluid-tightly sealed to the container 3 in such a manner that the two apertures 5,9 are aligned. The sealing of the sheet 8 to the container may be by adhesive or the sheet may be in the form of a screw-threaded lid as is more fully described below in relation to a second embodiment of the invention.

As previously mentioned the aperture 5, or alternatively the aperture 9, may be provided with two constricted portions 10 (see FIG. 6) to reduce the possibility of accidental release of the lubricant composition under the conditions mentioned. In this modification, it may be preferable for the aperture with the constriction to be the aperture 9 in a sheet 8 so that the aperture can be easily sealed prior to the sheet 8 being located on the container 3.

Figure 7:
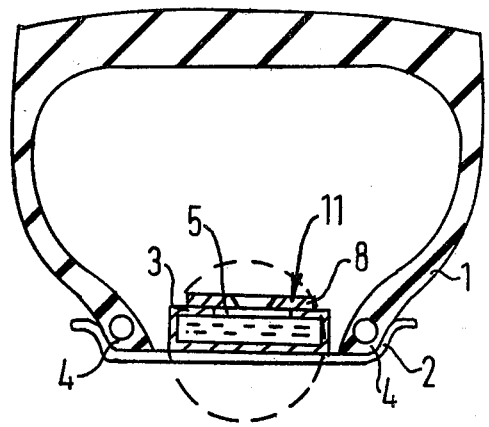
FIGS. 7 and 8 show views similar to those shown in FIGS. 1 and 2 respectively of a second embodiment of the invention.
Figure 8:
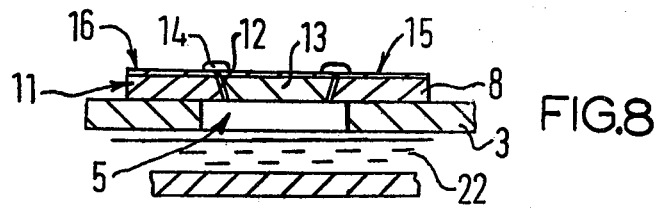

A second embodiment is shown in FIGS. 7 and 8. FIG. 7 similarly to FIG. 1, shows a tire 1 located on a wheel rim 2 on which is provided a lubricant composition enclosing means 3 disposed between the tire beads. The container 3 has an entry/exit aperture 5 which is circular and covered by a sealing member 11. The sealing member comprises a sheet 8 of a material of low thermal conductivity, e.g. Tufnol, a second aperture 12, a closure means in the form of a plug 13 and an annular sealing band of solid material 14.

The sheet 8 may be circular and is fluid-tightly sealed to the container 3. The aperture 12 tapers inwardly towards the interior of the container 3 and into which the plug 13, of substantially complementary frusto-conical shape is located. The plug 13 is also made of Tufnol. The plug 13 is retained in the aperture 12 by means of an annulus of solid material 14, said sealing material 14 being the same as that described in relation to FIG. 1.

Although the sealing number is shown as comprising a sheet 8, in a modification not shown, the sealing member may comprise the plug 13 and the solid material 14, the plug 13 fitting directly into the aperture 5 which may be suitably shaped in a similar manner to the aperture 12.

The sheet 8 has provided on the outer surface thereof a film 15 of a material having a high thermal diffusivity, e.g. copper or aluminium the film 15 being in good thermal contact with the solid material 14. The surface 16 of the film 15 is preferably matt black to assist in heat absorption. To increase the absorption surface to a maximum, the plug 13 is also provided on its surface with the film 15.

The film 15 may also be provided on the surface of the container 3 described in FIGS. 1 to 6, or may form the container e.g. an aluminium container.

Figure 9:
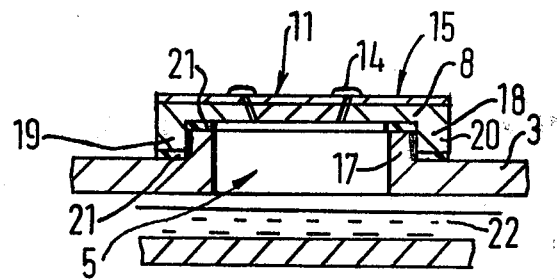
FIGS. 9 and 10 show similar views as shown in FIG. 8 with modifications thereon.

In the modification of the second embodiment shown in FIG. 9 the entry/exit 5 of the container 3 is provided with an annular outwardly extending flange 17 which has a screw-threaded portion 18 on its radially outer surface. The sheet 8 is in the form of a screw cap and has a screw-threaded portion 19 on the radially inner surface of an axially extending annular flange 20. In order to ensure that the enclosing means is securely sealed, rubber washers 21 are provided between the sheet 8 and the container 3.

Figure 10:
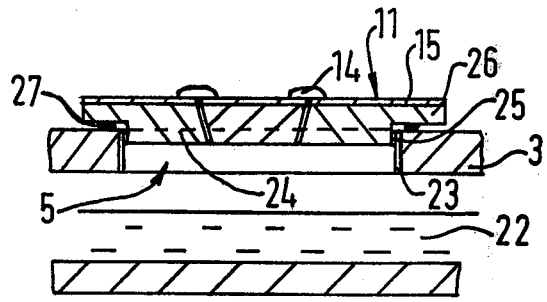

In the modification of the second embodiment shown in FIG. 10 the circular entry/exit hole 5 of the container 3 is provided on the circumferential surface thereof with a screw thread 23. The sheet has a portion 24 which is of complementary shape to the entry/exit hole 5 of the container 3 and has a screw-threaded portion 25 on the radially outer surface thereof. The portion 24 is provided with a radially extending flange 26 which extends over a portion of the exterior surface of the container 3. To ensure that the enclosing means is sealed by the sheet 8 a rubber washer 27 is located between the flange 26 and the container 3.

Figure 6:
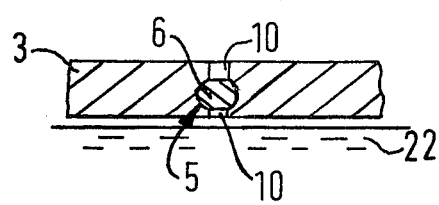

In a further modification of the second embodiment (not shown) the space between the closure means and the aperture may be formed to have a constricted portion similar to that described with reference to FIG. 6.

In operation upon deflation of a tire and wheel assembly the temperature within the assembly rises the film 15 with its matt black surface 16 absorbs the heat quickly and, due to the film 15 having a high thermal diffusivity, the heat is rapidly transferred to the solid material 6,14. As the temperature of the solid material 6,14 attains the softening and/or melting point thereof the blob 6 or plug 13 is released thereby causing the container to open and release the lubricant 22 into the interior of the tire and wheel assembly. If the device for converting mechanical energy into heat is used the softening and/or melting point of the solid material 6,14 may be attained more quickly.

Figure 12:
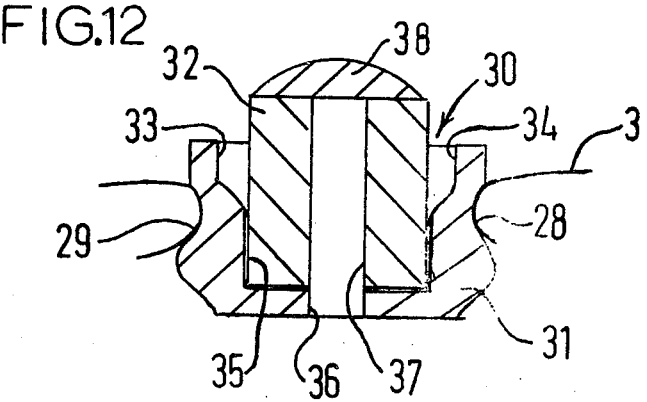
FIG. 12 shows an enlarged partial cross-section of the container enclosed in the chain dotted portion in FIG. 11.
Figure 11:
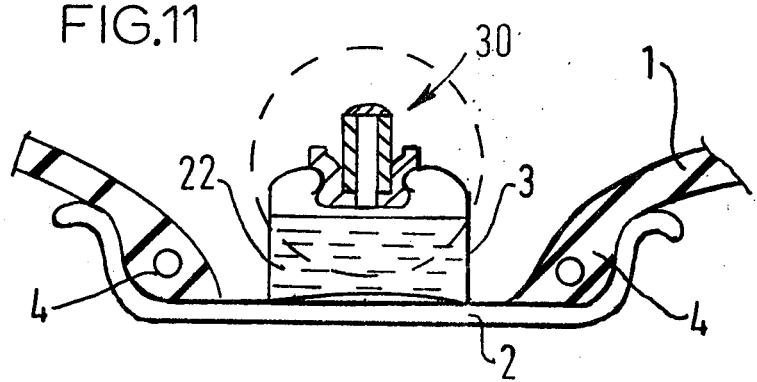
FIG. 11 shows a schematic cross-section of a tire and wheel assembly with a container in accordance with a third embodiment of the invention.

As shown in FIGS. 11 and 12 in accordance with a third embodiment of the invention, the container 3 is provided with a circular aperture 28 having an inwardly extending flange 29, which aperture being sealed by a sealing member in the form of a valve 30. The valve 30 comprises a valve plug 31 and a valve peg 32. The valve plug 31 is provided with a recess portion 33 facing outwardly of the container 3, the recess portion 33 having two parts of different diameter 34 and 35 respectively, the part 35 of smaller diameter creates an interference fit with the peg 32 when it is located therein.

The plug 31 and the peg 32 each have an aperture 36 and 37 respectively extending axially therethrough of, for example 3 mm. diameter, the apertures 36 and 37 being coaxial in the assembled condition of the sealing member. The end of the aperture 37 remote from the recess portion 33 is sealed with the solid material 38 which may, for example, be bitumen (softening point in the range 80° to 90°C.). The material of at least the peg 32 is preferably a material of low heat conductivity and may, for example, be polystyrene.

The valve 30 is assembled by the plug 31 being fitted into the aperture 28. Since the peg 32 is not yet located in the recess portion 33, the plug 31 can deform to fit into the aperture 28 and is held therein by the flanges 29. The peg 32, sealed with the solid material 38, is then located in the recess portion 33 and creates an interference fit in the part 35 thereof. The plug 31 is thereby prevented from deforming and will not come back out of the aperture 28.

In operation, the valve 30 is operable in two ways. Firstly, the part 34 of larger diameter of the recessed portion 33 allows the plug to deform in that part and it can therefore be pushed into the container. Therefore, when the tire and wheel assembly is used in a deflated condition the interior surface of the tread portion contacts the peg 32 and pushes the plug 31 and peg 32 into the interior of the container 3 thereby allowing the lubricant composition 22 to escape from the container 3. Secondly, the valve 30 may not operate as described above, for example, due to slow loss of inflation pressure, in which circumstances the temperature will increase due to greater flexing etc. brought about by the decreasing inflation pressure. Therefore, the increase in temperature will cause the solid material 38 to soften and thereby release the lubricant composition 22 to the interior of the tire and wheel assembly.

Having now described my invention, what I claim is:

1. An enclosing means for enclosing at least part of a lubricant composition for use in a pneumatic tire and wheel assembly, comprising a container in which the lubricant composition is located, an aperture in the container through which the lubricant composition can leave the container, and a sealing member for sealing the aperture, the member comprising at least in part a solid material having a softening and/or melting point in the range 60°C. to 120°C. whereby the member prevents escape of lubricant composition from the container during use of the enclosing means in normal running of the tire but on the build-up of an excessive temperature in the interior of the tire and wheel assembly the solid material of the sealing member will soften and/or melt and thereby release the lubricant composition.

2. An enclosing means according to claim 1 wherein the sealing member comprises a blob of the solid material located so as to cover the aperture.

3. An enclosing means according to claim 2 wherein the blob of solid material at least partially enters the aperture.

4. An enclosing means according to claim 1 wherein the sealing member comprises a closure means and the solid material, the material retaining the closure means in position to seal the aperture.

5. An enclosing means according to claim 4 wherein the aperture tapers inwardly towards the container, the closure means being of substantially complementary frusto-conical shape and being held in the aperture by an annular sealing band of the solid material.

6. An enclosing means according to claim 1 wherein the sealing member comprises a dual actuated lubricant release mechanism, the mechanism having an aperture therethrough sealable by at least the solid material, whereby during use if the mechanism fails to release the lubricant composition on deflation of the tire and wheel assembly, the temperature in the assembly will rise and cause the solid material to soften and/or melt and thereby release the lubricant composition.

7. An enclosing means according to claim 6 wherein the release mechanism comprises a peg having an aperture therethrough sealed at one end with the solid material, the peg fitting fluid-tightly in the aperture in the container whereby during use upon deflation of the assembly the peg can be pushed, by the tread of the tire, into the container to release the lubricant composition, or should this fail the temperature in the assembly will rise and the lubricant composition release by the softening and/or melting of the solid material.

8. An enclosing means according to claim 6 wherein the release mechanism is in the form of a valve, said valve comprising a valve plug which fits fluid-tightly in the aperture of the container and has a recessed portion open to the exterior of the container, a valve peg which is located in the recessed portion and is an interference fit with the inner part thereof, both the valve plug and the valve peg have an aperture extending therethrough, the apertures being co-axial one with the other in use, the end of the aperture in the valve peg remote from the recessed portion being sealed by the solid material whereby during use upon deflation of the tire and wheel assembly the peg and thereby the plug, can be pushed, by the tread of the tire, into the container to release the lubricant composition, or should this fail the temperature in the assembly will rise and the lubricant composition released by the softening and/or melting of the solid material.

9. An enclosing means according to claim 1 wherein the solid material is a material having a high thermal diffusivity.

10. An enclosing means according to claim 1 wherein the container comprises plastics material.

11. An enclosing means according to claim 10 wherein the plastics material is a material having a low thermal conductivity.

12. An enclosing means according to claim 1 wherein the container comprises thin metal or metal alloy sheet material.

13. An enclosing means according to claim 12 wherein the container is made of aluminium.

14. An enclosing means according to claim 12 wherein the container has an inner liner of a material of low thermal conductivity.

15. An enclosing means according to claim 1 wherein the container is provided with a lid.

16. An enclosing means according to claim 15 wherein the lid has the aperture therein.

17. An enclosing means according to claim 1 wherein the sealing member comprises a sheet of material having a low thermal conductivity and having a second aperture therein which is located to be in substantial alignment with the first aperture and which is sealed by the closure means and/or the solid material.

18. An enclosing means according to claim 17 wherein the sheet of material of low thermal conductivity is in the form of a screw-threaded lid which can be screwed onto a complementary screw-threaded portion associated with the first aperture.

19. An enclosing means according to claim 1 wherein the container is provided with a self-sealing rubber diaphragm through which the lubricant composition can be inserted into the container.

20. An enclosing means according to claim 1 wherein at least a part of the surface of the container is covered by or is formed of a film of material of high thermal diffusivity, which film also being in good thermal contact with the solid material.

21. An enclosing means according to claim 20 wherein the surface of the film is matt black.

22. An enclosing means according to claim 1 wherein heat is transferred to the film and/or solid material by means of a device for converting mechanical energy into heat, which device being operable by the tire and wheel assembly in a deflated condition.

23. An enclosing means according to claim 1 wherein the solid material has a softening and/or melting point in the range 70°C. and 100°C.

24. An enclosing means according to claim 1 wherein the aperture is provided with at least one constricted portion adjacent the end thereof which opens into the tire and wheel assembly during use, the solid material being disposed between the constricted portion and the interior of the container.

25. An enclosing means according to claim 1 wherein the aperture in the container may be extended by a tube, sealed by the sealing member, having at least one constricted portion therein, the tube being located co-axially with the aperture in the container and fluid-tightly attached to the container.

26. An enclosing means according to claim 25 wherein the tube is made of a material having a high thermal diffusivity.

27. A pneumatic tire and wheel assembly comprising an enclosing means for enclosing at least part of a lubricant composition as claimed in claim 1.

* * * * *

UNITED STATES PATENT OFFICE
CERTIFICATE OF CORRECTION

PATENT NO. : 3,901,301
DATED : August 26, 1975
INVENTOR(S) : Reginald Harold Edwards It is certified that error appears in the above-identified patent and that said Letters Patent are hereby corrected as shown below:

Please correct Item [73] to read as follows:

Item [73] Assignee: DUNLOP LIMITED

Signed and Sealed this twenty-fifth Day of November 1975

[SEAL]

Attest:

RUTH C. MASON
*Attesting Officer*

C. MARSHALL DANN
*Commissioner of Patents and Trademarks*